United States Patent [19]

Sugino

[11] 4,109,763
[45] Aug. 29, 1978

[54] WHEEL STOP APPARATUS

[76] Inventor: Takayuki Sugino, 52 Murauchishimo, Karasumori-cho, Nakamura-ku, Nagoya-shi, Aichi-ken, Japan

[21] Appl. No.: 792,665

[22] Filed: May 2, 1977

[30] Foreign Application Priority Data

Feb. 14, 1977 [JP] Japan .................................. 52-15689

[51] Int. Cl.² ............................................. B60T 3/00
[52] U.S. Cl. ..................................................... 188/32
[58] Field of Search .................... 188/32, 4 R; 29/513

[56] References Cited

U.S. PATENT DOCUMENTS

| | | | |
|---|---|---|---|
| 1,617,369 | 2/1927 | Blakely | 188/32 |
| 1,768,265 | 6/1930 | Nicholls | 188/32 |
| 1,849,964 | 3/1932 | Snyder | 188/32 |
| 2,018,826 | 10/1935 | Zell | 29/513 X |
| 2,903,094 | 9/1959 | Andersen | 188/32 |
| 3,387,686 | 6/1968 | Little | 188/32 |

FOREIGN PATENT DOCUMENTS 621,188   5/1927   France ..................................... 188/32

*Primary Examiner*—Duane A. Reger
*Attorney, Agent, or Firm*—Jones, Thomas & Askew

[57] ABSTRACT

The present invention relates to a wheel stop apparatus comprising a stopper plate, one end of which is pivotally attached to a bottom plate, the other end of the stopper plate being raised by a support plate over the bottom plate whereby the stopper plate is sloped and supported. The wheel stop apparatus of the present invention has the first feature that all members of the apparatus are made from plate materials and the second feature that all attaching portions between the members are formed by pressing. Above first and second features direct to the third feature that the wheel stop apparatus of the present invention is fabricated only by pressing. Further, the fourth feature consists in no occurrence of deformation in the stopper plate because the turning side end of the stopper plate is supported along its whole width by the support plate.

3 Claims, 8 Drawing Figures

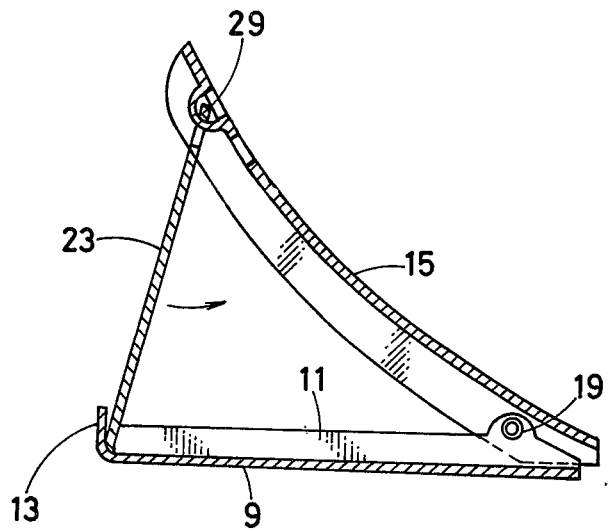
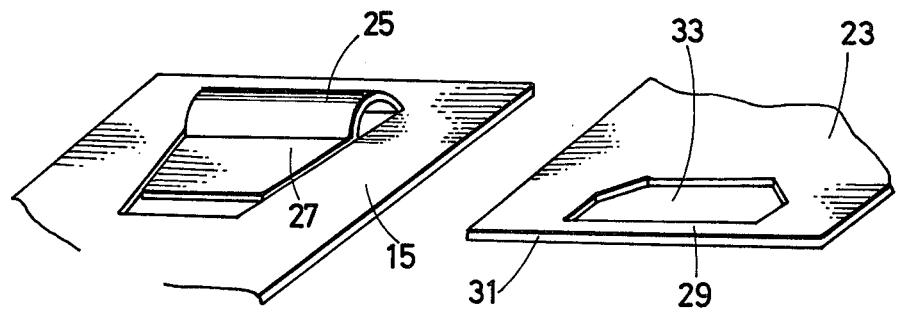
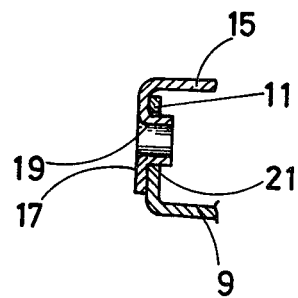

WHEEL STOP APPARATUS

DESCRIPTION OF THE INVENTION

The present invention relates to a wheel stop apparatus comprising a stopper plate, one end of which is pivotally attached to a bottom plate, the turning side end of the stopper plate being raised by a support plate over the bottom plate whereby the stopper plate is sloped and supported.

A conventional wheel stop apparatus, as shown in FIG. 1, a stopper plate 3, one end of which is rotatably attached to a bottom plate 1 by means of a supporting rod 5, and a support member 7, which is made from a rod material and formed by bending it into a near U-shape, is rotatably attached at both ends thereof to the other end of the stopper plate. In such a wheel stop apparatus, since materials different in the art such as plates and rods are used, a number of processing steps and the large expense are required for the fabrication of the apparatus, and the weight of the apparatus becomes heavy. Further, there is a problem that deformation is likely to occur because the stopper plate 3 is not supported in the central area of its width by the support member 7 so that the stopper plate 3 is depressed or bent by the weight of a wheel.

The first object of the present invention is to provide a wheel stop apparatus wherein all members of the apparatus can be made from plate materials.

The second object of the present invention is to provide a wheel stop apparatus wherein all attaching portions between the members of the apparatus can be formed by pressing.

The third object of the present invention is to provide a wheel stop apparatus which can be fabricated only by pressing.

The fourth object of the present invention is to provide a wheel stop apparatus wherein deformation of a stopper plate is prevented.

These and other objects and advantages of the present invention will become more apparent from the following detailed description with the aid of the accompanying drawings, wherein:

BRIEF DESCRIPTION OF DRAWINGS

FIG. 3 is a sectional view of FIG. 2;

FIG. 4 and FIG. 5 are perspective views of portions of FIG. 2, respectively;

FIG. 6 is a sectional view of a portion of FIG. 2;

DETAILED DESCRIPTION OF PREFERRED EMBODIMENTS

Figure 1:
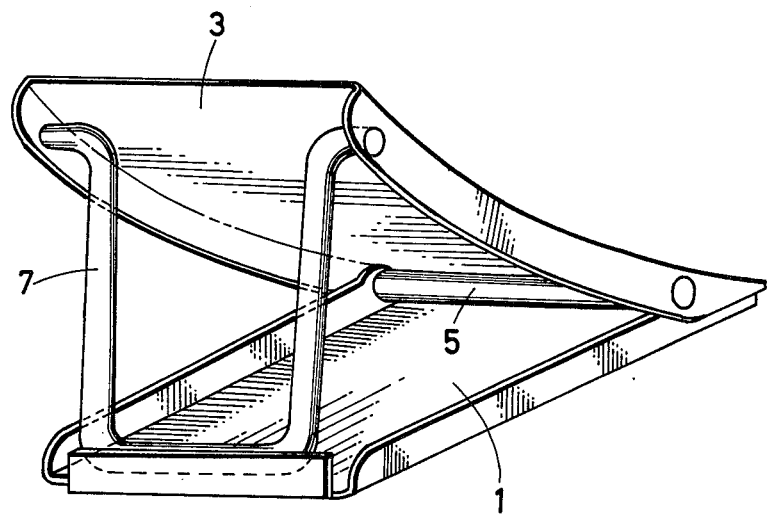
FIG. 1 is a perspective view of a conventional car stop apparatus.

There is shown in FIGS. 2 to 6 a wheel stop apparatus which is the first preferred embodiment of the present invention. There is indicated at 9 a bottom plate which is made from an plate material almost rectangular in shape. Both the opposite sides of the bottom plate 9 are bent up along their edges at a nearly constant width to form side plate portions 11, 11, and at the same time one of both the other sides of the bottom plate 9 is also bent up along its edge at a nearly constant width to form a supporting portion 13. A stopper plate, which is indicated at 15, is made from a plate material almost square in shape, both the opposite sides of which are bent up along their edges at a nearly constant width to form side plate portions 17, 17. The stopper plate 15 is almost the same as the bottom plate 9 in the surface configuration. The side plate portions 11, 11 are punched out holes 21, 21 at their ends opposite to the stopper plate 13 by the pressing. Each side plate portion 17, 17 is also punched out by pressing at each one end to form an axis portion 19, 19 which is smaller than the hole 21, 21 in the inner diameter and projects inwardly. The stopper plate 15 is rotatably attached to the bottom plate 9 by inserting the portions 19, 19 into the holes 21, 21. On the contrary, the axis portions may be formed in the side plate portions 11, 11, and the holes 21, 21 may be formed in the side plate portions 17, 17. A support plate is indicated at 23, the width of which is slightly narrower than the distance between the side plate portions 17, 17, and the length of which is shorter than that of the stopper plate 15. A bearing portion, which is indicated at 25, is so formed that the support plate 15 is cut at its turning side end by pressing into a cut lip 27 which is continued to the stopper plate 15 at the side parallel to the turning side edge and projected downwards in a circular arc parallel to the side edge. 29 is an axis portion, which is formed between an opening punched out along one side edge 31 of the support plate 23 and the side edge 31. The axis portion 29 is inserted into the bearing portion 25 whereby the stopper plate 15 is supported by the support plate 23, which is rotatably attached to the stopper plate 15. The distance from one pivotted point between the stopper plate 15 and the bottom plate 9 to the bearing portion 25 is so designed that this distance is shorter than the distance from said pivoted point to the supporting portion 13. Therefore, by intimately contacting the turning side end of the support plate 23 with the supporting portion 23, it is possible to support the stopper plate 15 in a raised position of the turning side end of the stopper plate 15 over the bottom plate 9. Since the turning side end of the stopper plate 15 is supported along its whole width by the upper end of the support plate 23, there is no possibility of deformation by sinking down the stopper plate 15 in the central area of its width.

Figure 2:
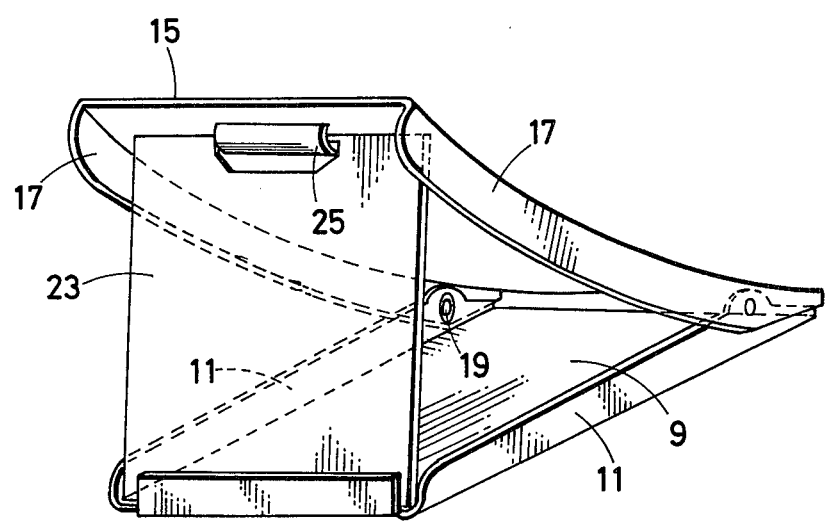
FIG. 2 is a perspective view of a preferred embodiment of the present invention.

The wheel stop apparatus of the present invention is used by applying a wheel of an automobile and the like to the stopper plate in the position shown in FIG. 2 wherein the turning side end of the support plate 23 is intimately contacted with the supporting portion 13, and the stopper plate 15 is supported in the state wherein the turning side end of it is raised over the bottom plate 9. In case where the wheel stop apparatus is not used, the turning side end of the support plate 23 is rotated inwardly, and then the turning side end of the stopper plate 15 is rotated toward the bottom plate 9 so that the apparatus is folded up. The wheel stop apparatus of the present invention is thin in the folded position and very handy to carry, since it is constructed by the use of only plate materials.

Though there has been described the wheel stop apparatus wherein the bottom surface of the bottom plate, the upper surface of the stopper plate 15, the both surfaces of the support plate 23 and the like are flat as shown in FIGS. 2 to 6, it is more preferable to provide grooves 35, which may have any suitabe shape and be projected or recessed, in the bottom plate 9, the stopper plate 15 and the support plate to reinforce these plates.

Figure 7:
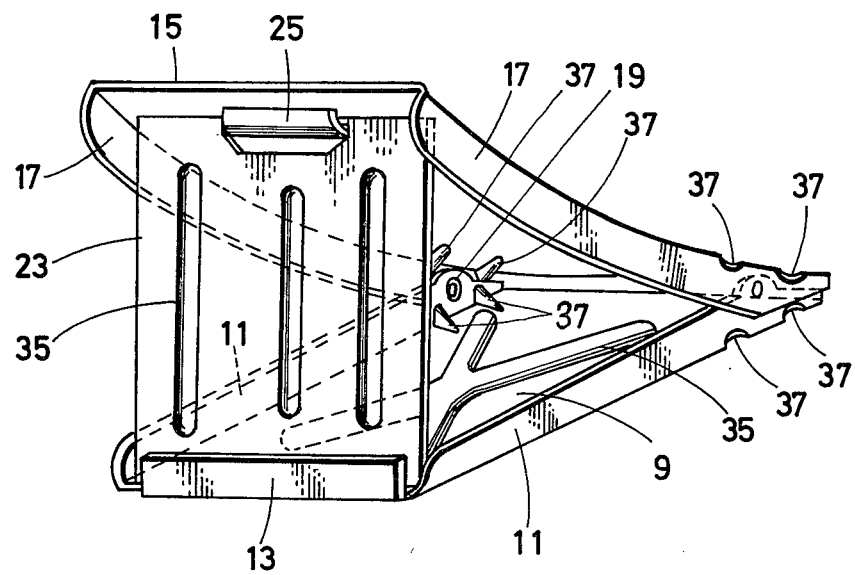
FIG. 7 is a preferred alternative embodiment of the present invention wherein grooves for reinforcement are provided.
Figure 8:
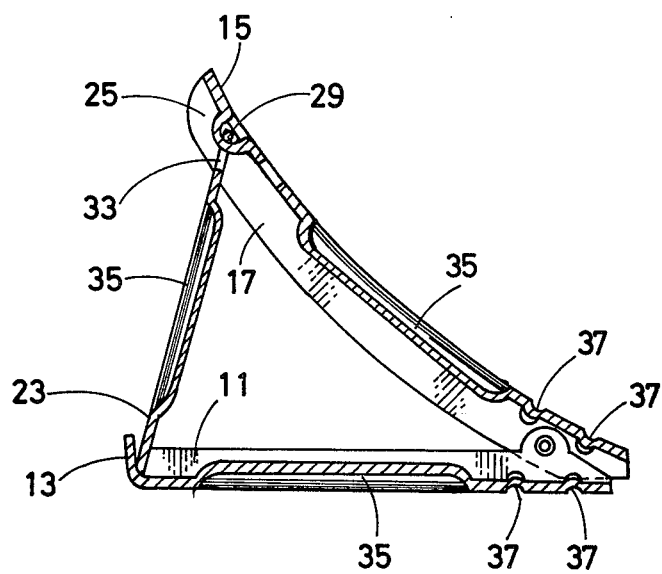
FIG. 8 is a partially sectional view of FIG. 7.

Further, it is preferrable to provide grooves 37 at any suitable place on the bend line defined by bending the bottom plate 9 to form the side plate portions 11, 11 and at any suitable place on the bend line defined by bending the stopper plate 15 to form the side plate portions 17, 17, preferrably, at places near to the pivotted point between the bottom plate 9 and the stopper plate 15 on the both bend lines whereby these side plate portions are reinforced and prevented from spreading. In case where the grooves are so provided, when the wheel apparatus is folded up, the projected and recessed surfaces of the bottoms of the grooves provided for the bottom plate 9, the stopper plate 15 and the support plate 23 contact intimately in turn, as conceived from FIGS. 7 and 8, whereby the support plate 23 between the bottom plate 9 and the stopper plate 15 does not rattle. In such a sandwiched position of the support plate 23, this plate serves as one kind of elastics.

Having thus described, the wheel stop apparatus of the present invention comprises a bottom plate which is made from a plate material almost rectangular in shape, and includes side plate portions formed by bending up along either ones of both the opposite sides at a nearly constant width from their side edges as well as a supporting portion formed by bending up along one side of the other opposite sides at a nearly constant width from its side edge; a stopper plate which is made from a plate material almost rectangular in shape, and includes side plate portions formed by bending down along either ones of both the opposite sides at a nearly constant width from their side edges, one end of each side plate portion being pivotally attached to the side plate portion of the bottom plate at the opposite side to the supporting side plate portion; and a support plate which is made from a plate material almost rectangular in shape and slightly smaller than the stopper plate in width and length, and rotatably attached at its one end to the turning side end of the stopper plate: thus all the members of the apparatus are plate material and the first feature is to rerequire only one kind of material for this apparatus. Further, holes are punched out in the side plate portions of either the bottom plate or the stopper plate, axes projecting toward the holes are provided in the other side plate portions, and the stopper plate is pivotally attached to the bottom plate by inserting the axes into the holes; further a bearing portion parallel to the turning side of the stopper plate is formed by cutting into a lip which is then curved and projected downwardly, the support plate is punched out at its one side into an opening having a side parallel to the side edge of the support plate to form an axis between the side edge and the opening, and the stopper plate is rotatably attached to the turning side end by inserting the axis into the bearing portion: thus all the attached portions of the bottom plate, the stopper plate and the support plate is formed by pressing, this is the second feature. Therefore, the wheel stop apparatus of the present invention can be fabricated in simple processes and a small labour and expense, this is the third feature. Moreover, the turning side end of the stopper plate is supported along its whole width whereby there is no possibility of deformation by depressing the stopper plate in the central area of its width, and the strength of the apparatus is improved to a great extent only by the provision of grooves, this is the fourth feature.

It should be understood that the embodiments herein have been described only for the purposes of exemplification and can be changed and modified without departing from the spirit and scope of the present invention.

What is claimed is:

1. A foldable wheel stop apparatus comprising a bottom plate of plate material approximately rectangular in shape, which includes side flanges bent up along both its opposite sides of nearly constant width and an end flange bent up along its intermediate side of nearly constant width; a stopper plate of plate material approximately rectangular in shape, which includes side flanges bent down along its opposite sides of nearly constant width the adjacent ends of said side flanges of one of said plates being formed with punched out holes, and the adjacent ends of said side flanges of the other of said plates being formed with projections extending toward said holes, said projections being inserted into said holes whereby said stopper plate is pivotally attached to said bottom plate; a bearing member punched from the surface of said stopper plate at the end of said stopper plate remote from said projections and holes oriented parallel to the pivot axis of said bottom plate with said stopper plate, and a support plate of plate material approximately rectangular in shape and slightly smaller in width and length than the width and length of said stopper plate rotatably attached at one of its ends to the bearing member of said stopper plate, said bearing member characterized by having been formed by cutting a lip from the plate material of said support plate and curved and projected downwardly, and said support plate defining an opening adjacent one of its edges with the curved portion of said bearing member extending through said opening to form a hinge between said support plate and stopper plate.

2. The wheel stop apparatus according to claim 1 wherein said bottom plate is formed with grooves which project from its surface and said stopper plate and said support plate are formed with grooves which are recessed from their surfaces, respectively, said grooves being sized and positioned to nest with one another when said support plate is folded between said bottom plate and said stopper plate and when said bottom plate and stopper plate are folded together.

3. The wheel stop apparatus according to claim 1 wherein grooves (37) across the bend lines of said side plate portions (11, 11) and the bend lines of said side plate portions (17, 17) are provided near the attaching points between said side plate portions (11, 11) of the bottom plate (9) and said side plate portions (17, 17) of the stopper plate (15).

* * * * *